May 5, 1964     F. R. SCHOLLHAMMER     3,132,239
ELECTRON BEAM COMPRESSION WELDING
Filed April 25, 1962     2 Sheets-Sheet 1
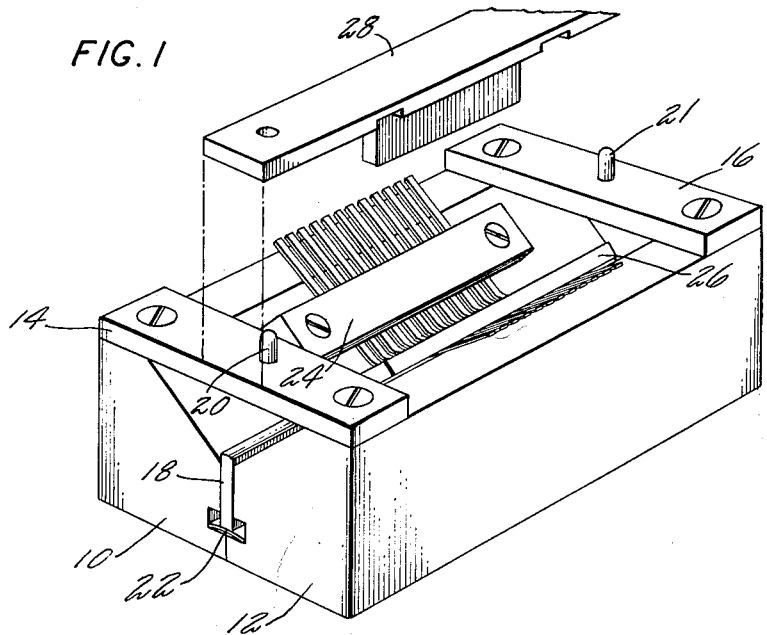
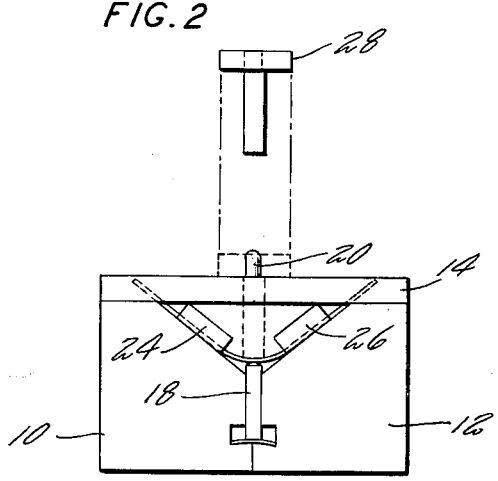
INVENTOR
FREDERICK R. SCHOLLHAMMER
BY Roger A. Van Kirk
AGENT May 5, 1964    F. R. SCHOLLHAMMER    3,132,239
ELECTRON BEAM COMPRESSION WELDING
Filed April 25, 1962    2 Sheets-Sheet 2

INVENTOR
FREDERICK R. SCHOLLHAMMER.
BY Roger A. Van Ikle
AGENT 3,132,239
ELECTRON BEAM COMPRESSION WELDING
Frederick R. Schollhammer, Simsbury, Conn., assignor to United Aircraft Corporation, East Hartford, Conn., a corporation of Delaware
Filed Apr. 25, 1962, Ser. No. 190,131
1 Claim. (Cl. 219—117)

My invention is directed to microelectronic joining techniques. Specifically, my invention is directed to compression welding of leads to macro and microelectronic circuit boards by electron beam processes.

There is an increasing demand for further miniaturization of electronic devices. This demand is occasioned partly by space age requirements for smaller, lighter, and more reliable packaging and also by the use of increasingly higher frequencies, especially in the computer field. The necessity for further miniaturizing of electronic devices has, in turn, brought about a requirement that new processes be developed for interconnecting these devices. That is, prior art methods of soldering leads to electronic circuit components are becoming increasingly inapplicable because of the relatively large size of soldering tools and further because the large amount of heat generated by these tools will damage the semiconductor materials universally used in miniaturized circuits. Although the electron beam has been in use since the discovery of the X-ray, the relatively recent introduction of electron beam technology as related to welding processes has provided the manufacturing breakthrough producers of macro and micro components have been seeking. Electron beam welding offers important advantages over other techniques in fabricating microminiaturized electronic circuits of optimum density, weight, and reliability. The advantages of this technique, some of which are common to other welding techniques as well, are that electron beam welding provides a better electrical contact because the interface between welded metals is minimized or eliminated so that a lower resistance is presented to the flow of electrical current through the junction. That is, current flow through the several interfaces common to a solder bond is eliminated. Also, welding results in improved reliability over soldered connections because welded joints are less susceptible than solder connections to contamination during the welding operation. With electron beam welding, corrosion and possible delamination are further minimized since the process is accomplished in a vacuum. Welding is also an improvement over soldered connections in that the resulting nugget structure has a greater resistance to vibration stress and fatigue than a solder joint. Another advantage realized through welding is the reduction of the hazard of thermal damage to components. An electron beam welder permits the release of very high energy into small areas for controlled brief periods of time. The time for welding of leads to components wtih an electron beam may be from 0.3 to 100 milliseconds and thus a bond may be made with low total energy input and, consequently, little heat effect outside the weld zone. Electron beam welding can, therefore, be successfully performed on miniaturized circuits without damaging semiconductors used in such circuits. Other advantages of welding are increased structural rigidity of the joint and better process control. As to the latter advantage, welding eliminates the preconditioning process required with soldering and the weld process can be established and repeated to give a high yield rate.

While some of the advantages mentioned above are common to other welding techniques, electron beam welding is superior to such other techniques in that it is not sensitive to surface irregularities and impurities, does not require up-set or other high presure contact, and it does not require electrodes and hence results in increased packaging density beyond the capability of other welding techniques. Also, electron beam welding eliminates the possibility of discharging high currents through sensitive components and permits wide variations among materials and material geometry with one welding schedule.

Electron beam welding is accomplished by first producing an electron space charge, accelerating the electrons, focusing the electrons into a beam and directing the beam on the work. High energy beams are now being produced with power densities up to $10^{10}$ watts per square inch and beam diameters in the neighborhood of .001". With such concentrated energy and appropriate beam control, pulsing and deflection devices, the electron beam welding machine provides a most versatile and flexible welding tool. The success of this equipment, however, depends largely upon the supporting tools and fixtures used to position the components to be welded in the desired relationship. In the prior art, welding of microminiaturized circuits and components was accomplished by the use of conventional resistance welders requiring high fixture pressures from the welding electrodes. This type of fixturing tends to displace or deform the fluid zone of the weld area due to surface phenomenon such as may be attributed to surface tension. Upon solidification, this deformation of the fluid zone often causes a reduction in the weld cross-sectional area thus reducing the weld strength tensile or shear values.

My invention overcomes the above disadvantages by placing the wires to be welded to miniaturized circuit boards or components in compression against the board or component to which they are to be connected and thereafter joining the parts by welding with an electron beam.

It is, therefore, an object of my invention to join conductors to microminiaturized circuit components.

It is also an object of my invention to weld conductors to microminiaturized electronic circuit components with an electron beam.

It is another object of my invention to position microminiature parts for welding.

It is yet another object of my invention to compression weld conductors to electronic components.

It is still another object of my invention to utilize the compressive force exerted by a deformable member to aid in welding that member to another member.

It is a further object of my invention to employ compression loading in the joining of microminiature electronic components.

These and other objects of my invention are accomplished by causing the conductors which are to be joined to a microminiaturized circuit component to take the form of curves. The circuit component is placed beneath the lowest point of the deformed conductors and then, by spring action, caused to push up against the conductors. When the weld is made, the wire, which is in compression because of its physical configuration, tends to push itself down towards the component and thereby adds its own force to aid in the welding operation.

My invention may be better understood and its numerous advantages will become apparent to those skilled in the art from the following disclosure taken together with the accompanying drawing wherein like reference numerals refer to like elements in the different figures and in which:

FIGURE 1 shows a fixture which may be used for welding fine wires or ribbons to a microcomponent in accordance with my invention.

FIGURE 2 is an end view of the fixture illustrated in FIGURE 1.

Figure 3:
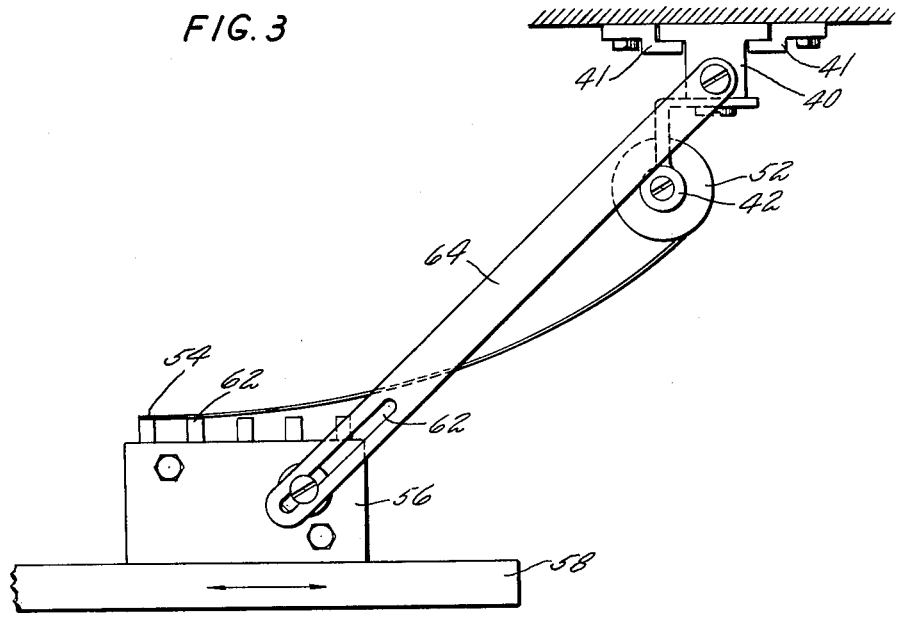
FIGURE 3 shows a fixture which may be used for welding fine wires or ribbons to a plurality of microcomponents in accordance with my invention.

Referring now to FIGURES 1 and 2, a fixture is shown which is comprised of a pair of blocks 10 and 12 which, when placed in the relationship shown, will form a V-shaped groove. At the bottom of the V-groove, between blocks 10 and 12, a slot is provided for holding the microcomponent 18 to which conductors are to be welded. The cross-sectional width of this slot may be varied and the blocks are held in proper orientation by a pair of elongated members 14 and 16 which span the V-groove and are bolted to the top of each of blocks 10 and 12. Members 14 and 16 have glide fingers 20 and 21, respectively, extending from the tops thereof. The function of these guide fingers will be described below. Each of blocks 10 and 12 has a rectangular cut-out running the length thereof at the bottom of the space provided for the microcomponent 18. A spring member 22 is placed in this cut-out beneath the microcomponent so as to tend to force the work piece upward out of the slot. Blocks 10 and 12 are provided with means for receiving holding plates 24 and 26, respectively, which lock the conductors in position for welding to the work piece.

In operation, the microcomponent, which may be a 10 mil ceramic printed circuit wafer with a metalized surface, is placed in the slot between blocks 10 and 12. A shim or spring member 22 is then positioned beneath the wafer 18. Next, the conductors which are to be welded to the ceramic wafer are laid across the top of the V-shaped groove. These conductors, in a typical case, may be copper ribbon of approximately .002″ by .01″ cross-section. The conductors are then pressed down against the ceramic wafer with a gage block 28, which has holes therein for engaging the above mentioned guide fingers 20 and 21, thereby causing the conductors to take the shape of curves. The gage block 28 forces both the conductors and the wafer 18 downwards so as to cause compression of spring 22. The gage block is held in this position while the holding plates 24 and 26 are placed over the conductors and tightened so as to lock the conductors in position. The gage block is then removed and the fixture is placed in the work chamber of an electron beam welding machine. In the welding machine, the fixture is positioned beneath the beam by means of a movable work table, and then the electron beam is deflected along the edge of wafer 18 and caused to weld the conductors thereto at the desired spots by pulsing the beam.

Figure 4:
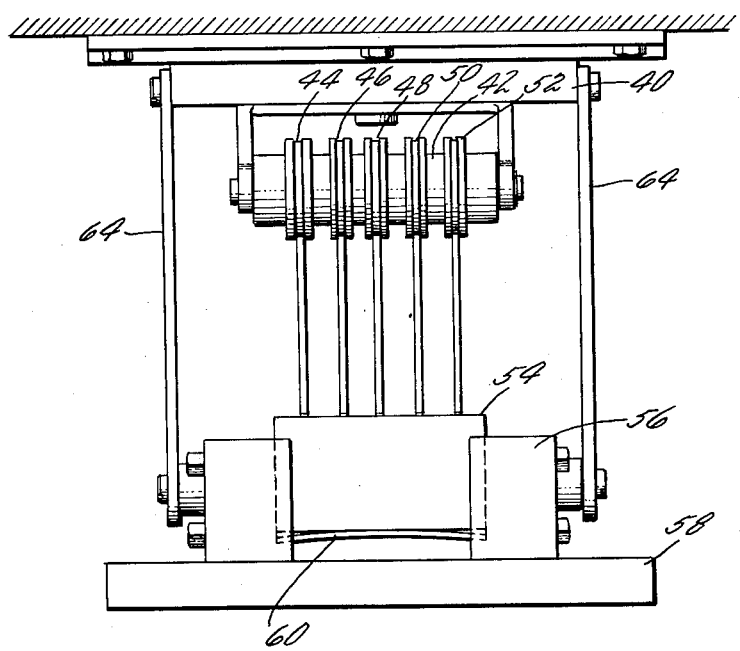
FIGURE 4 is an end view of the fixture illustrated in FIGURE 3.

Referring now to FIGURES 3 and 4, there is shown a fixture which provides a unique method for positioning multiple micro or macro components for welding leads thereto with an electron beam. By use of the fixture shown by these figures, a series or matrix of fine wire ribbons can be accurately positioned and held in contact with the surface of the components to which the wires are to be welded. As with the fixture shown in FIGURES 1 and 2, this fixture incorporates a catenary type of loading system. However, unlike the fixture of FIGURES 1 and 2, this fixture requires no holding plates to clamp the wire ribbons in place. In FIGURES 3 and 4, a slide bar 40 is shown in a track 41 which is fastened to the top of the work chamber of an electron beam welding machine. Slide bar mechanism 40 supports an axle 42 which in turn supports spools 44, 46, 48, 50 and 52 upon which metal ribbon or wires are wound. Alternatively, the wires or ribbons might be wound on axle 42 as an assembly, thereby eliminating spools 44, 46, 48, 50 and 52. Such a ribbon assembly would consist of a plurality of metal ribbons joined together with a mylar or tape cross-system. From the spools, the wire or ribbon is extracted or fed out to the required distance and then mechanically clamped, bonded, or resistance welded to a first metalized ceramic wafer 54 or any suitable member which can serve as an anchor. Wafer 54 is supported in a slot in a module 56 which is removably mounted on a movable table 58. Module 56 also has slots therein for receiving a plurality of micro components, which may be other ceramic wafers having metalized surfaces, to which the wires are to be welded. A shim 60, as shown in FIGURE 4, is used to keep micro components at the proper height to contact the wires.

In operation, the wires are attached to the member 54 and the fixture is positioned in the work chamber of an electron beam welding machine by inserting slide bar 40 in track 41. Module 56 is then fastened to movable table 58. Next, the fixture is positioned so as to place member 54 under the electron beam by moving the slide bar horizontally to the proper position. The table 58 is then moved to the right, as viewed in FIGURE 3, until the wires contact the second wafer 62 at which point a plurality of welds is made by deflecting the electron beam along the edge of the wafer 62. The process is then repeated until the welds have been made to each of the wafers carried by module 56. As table 58 moves, module 56 slides in slots 62 in arms 64 thereby remaining at the same vertical height. As with the fixture of FIGURES 1 and 2, pressure or force between the wires and wafers loads the wire to the wafer, even during the welding process at which time the nugget is fluid. The compression of the wire is pre-induced and is a function of the arc of the wire.

From the above discussion it can be seen that my invention produces an increased uniformity of multi-weld structures since the compressive force exerted by the conductors against the wafer can be adjusted to feed material into the solid weld zone areas. Also reduction of weld cross-section or build-up of the weld cross-sectional areas may be achieved by proper selection of the included angle of contact, equivalent spring loading, and contact areas between the conductors and components.

While the preferred embodiments of my invention have been shown and disclosed, various modifications and substitutions may be made without deviating from the scope and spirit thereof. Thus my invention has been described by way of illustration rather than limitation and accordingly it is understood that my invention is to be limited only by the appended claim taken in view of the prior art.

I claim:

A method of joining a deformable member to a body comprising:

positioning a body in a welding fixture, placing a deformable member on the fixture in such a manner that it extends over but does not contact the body, clamping a first end of the deformable member to the fixture, deforming the member by pressing it downward into contact with the body, constraining the second end of the deformed member so that contact between the member and the body is maintained, urging the body upward against the member whereby the member is in compression against the body at its point of contact therewith, and welding the member to the body at the point of contact with an electron beam.

References Cited in the file of this patent

UNITED STATES PATENTS

| | | |
|---|---|---|
| 2,315,055 | Heller | Mar. 30, 1943 |
| 2,319,455 | Hardman et al. | May 18, 1943 |
| 2,492,357 | Chatterjea et al. | Dec. 27, 1949 |
| 2,932,720 | Stohr | Apr. 12, 1960 |

FOREIGN PATENTS 1,205,947  France  Aug. 24, 1959

OTHER REFERENCES

"Impossible" Welds, Welding Journal, October 1961, p. 1011.

German application 1,116,826, printed Nov. 9, 1961.